Jan. 13, 1931. L. J. LEON Re. 17,926

BIRD CAGE

Original Filed July 15, 1926

Inventor

L. J. Leon

By Rockwell & Barthelow

Attorneys

Reissued Jan. 13, 1931

Re. 17,926

UNITED STATES PATENT OFFICE

LEWICKI J. LEON, OF WEST CHICAGO, ILLINOIS

BIRD CAGE

Original No. 1,629,717, dated May 24, 1927, Serial No. 122,519, filed July 15, 1926. Application for reissue filed April 30, 1929. Serial No. 359,401.

One object of my invention is to provide a top fastening which will permit the cage body to be turned relatively to the loop by which the cage is carried or suspended, without affecting the holding or clamping action of the fastening, thereby allowing the cage body to be turned in any direction for facing it or be turned when carried by the loop, without loosening the connection between the loop and the cage body.

A further object of my invention is to provide a more simple and efficient construction than heretofore employed for this purpose and also a construction which will permit assembly without scratching or marring the parts and without the use of tools.

The invention consists further in the matters hereinafter described and claimed.

Figure 1:
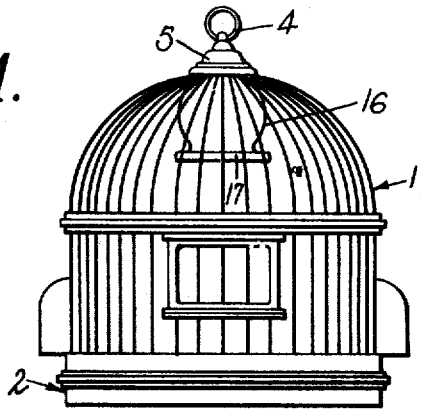
Fig. 1 is a front view of a bird cage having a top cap and a loop fastened thereto in accordance with my invention.
Figure 2:
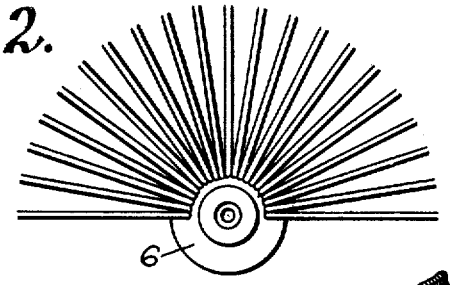
Fig. 2 is a top plan view of the top of the cage before the loop and cap are applied, only half of the wires being shown for the sake of illustration.

In the drawings, the cage body is indicated by 1 and the base by 2. These parts may be constructed and shaped as desired and may be connected together in any suitable manner. The body 1 is composed of a plurality of vertically extending wires 3, 3, most of which reach from the top to the bottom of the cage body. At the top of the cage there is a loop 4 and a top cap 5, these being made and connected to the cage body in accordance with my invention.

Figure 3:
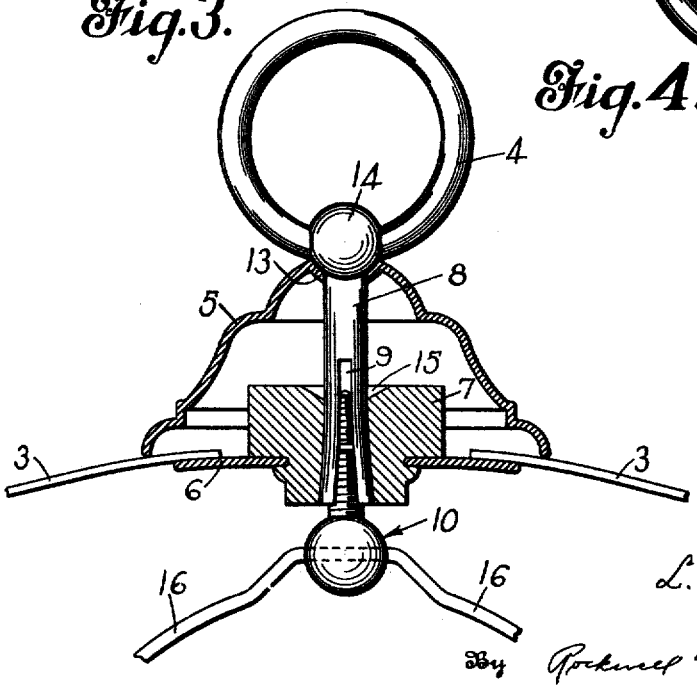
Fig. 3 is an enlarged vertical sectional view through the top cap and loop fastening.
Figure 4:
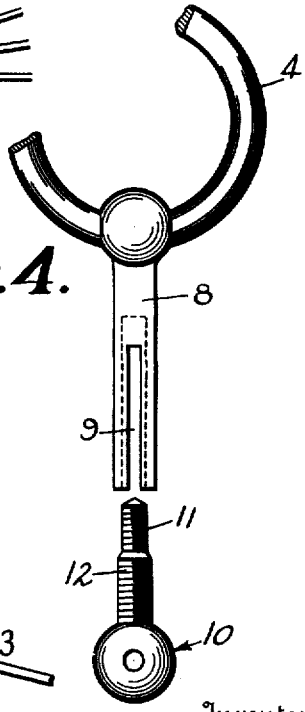
Fig. 4 is an elevational view of the loop with its stem and the expanding screw therefor, respectively, removed from each other and from the cage.

The upper ends of the wires 3, 3 extend to and are grouped about a plate 6 to which the wires are soldered or otherwise secured. An apertured boss-like member 7 is inserted through an opening in the plate between the adjacent ends of the wires 3, said member being soldered to the plate or secured thereto in any other way, as by having the edge of the opening in the plate through which the member 7 extends clamped in a groove made in the member, as shown in Fig. 3.

The loop 4 is attached to the upper end of a stem 8, the lower end of which is inserted into the aperture or bore of the boss 7 from above. The lower end portion of said stem 8 is hollow and is split or severed longitudinally, as by slots 9, 9 on opposite sides thereof, so that the portion of the stem in the bore of the boss may be expanded into tight frictional contact therewith by a screw 10, as shown in Fig. 3.

The hollow portion of the stem 8 is threaded interiorly to receive the threaded shank of the screw 10, the upper portion 11 of the shank having substantially the same diameter as the bore of the stem so that it may be screwed into the stem without expanding the same when the screw and shank are first engaged. The lower portion 12 of the shank is made slightly larger in diameter than the bore of the stem 8 so as to expand the split end of the stem into tight frictional contact with the bore or aperture of the boss 7 when said portion 12 is screwed into the stem. The bore of the boss 7 is tapered upwardly, becoming larger as it reaches its lower end, the purpose of which will presently appear.

The top cap 5 may be stamped or otherwise formed from sheet metal or other suitable material and be given the shape or contour desired for ornamental purposes. The stem 8 extends downward through the upper end of the cap, and the lower edge of the latter seats on the wires 3 about the outer edge of the plate 6, as shown in Fig. 3. The upper end of the cap is depressed, as at 13, to provide a concave recess for a spherical like head 14 at the upper end of said stem. The loop 4 is connected with the head 14 and with the latter seating in said recess the loop will not rest on the cap to scratch or mar the finish of the same should the two be turned relatively to each other when assembling or handling the cage.

When assembling the parts, the stem 8 is first inserted into the cap and then into the bore of the boss 7, the latter having a countersunk upper end, as at 15, so as to guide the stem in the bore of the boss. The shank of the screw 10 is then inserted into the stem 8 from the under side of the plate 6 and screwed into the stem by turning the screw through the wire bail 16 of the swinging perch 17 connected to the head of said screw. This allows the screw to be turned without the use of tools.

On turning the screw, the enlarged portion 12 on being screwed into the stem 8 expands the same into tight frictional contact with the bore of the boss 7 and, as the stem extends clear through the bore, the contact of the stem with the bore is throughout the length of the same. The bore of the boss being tapered upwardly causes the screw in the expanding action of its larger portion 12 to draw the stem downward without the head of the screw being required to seat against the boss 7 or the adjacent end stem. This downward drawing of the stem by the screw brings the head 14 of the stem tightly against the cap 5 and clamps the same against the cage body. The stem 8 being clamped in the boss 7 without the head of the screw 10 being against the boss or in contact with any parts of the adjacent structure, the screw 10 will turn in unison with the stem 8 when the latter through its loop 4 is rotated or turned relatively to the boss 7. The frictional engagement between the stem and the boss will permit this, but the tight contact between the parts will not be affected as the screw will not be turned to lessen its holding action on the stem. Thus, should the cage body 1 be turned with respect to the loop 4, as often happens when the cage is carried by or suspended from the loop, the latter and the cap will not become loosened and ultimately drop off, as with the ordinary bolt and nut connection heretofore employed. Moreover, as the screw turns in unison with the stem 8 under these conditions, the connection between the stem and the boss 7 remains substantially constant, so that the connection is neither tightened nor loosened as the cage body is turned first in one direction and then another, as with the ordinary bolt and nut connection. Moreover, with the bore or aperture of the boss becoming smaller as it approaches its upper end and the stem 8 being expanded, the stem is prevented from being pulled upward out of the boss.

No tools are required to assemble and tighten the parts together, as the screw 10 may be turned by the bail 16 of the swing 17. Then again, the parts are easy to assemble, no explanation or instruction being necessary, as the very nature of their construction suggests the manner in which they go together. This allows the cage to be shipped with the top structure disassembled, thereby allowing better packing and the use of smaller shipping containers and without any risk that the assembling being done by incompetent persons the finish will be scratched or marred.

The details of structure shown and described may be variously changed and modified without departing from the spirit and scope of my invention. The shape or style of the top cap is not essential to the invention.

I claim as my invention:

1. In a bird cage, the combination with a cage body and a carrying loop therefor, of a plate secured to the top of the body and having an apertured boss, a stem depending from the loop and having its lower end split and extending into the aperture of said boss, and a member for expanding the split end of the stem into frictional contact with the aperture of the boss so that the loop and the cage body may be turned relatively to each other without affecting the frictional connection between the stem and the boss.

2. In a bird cage, the combination with a cage body and a carrying loop therefor, of a plate secured to the top of the body and having an apertured boss, a stem carried by the loop and having its lower end hollow and split and extending into the aperture of said boss, and a screw insertable into said stem from below and made to expand the split end of the stem into frictional contact with the aperture of said boss so that the loop and cage body may be turned relatively to each other without affecting the frictional connection between the stem and the boss.

3. In a bird cage, the combination with a cage body and a carrying loop therefor, of a plate secured to the top of the body and having an apertured boss, a stem carried by the loop and having its lower end hollow and split and extending into the aperture of said boss, and a screw insertable into said stem from below and made to expand the split end of the stem into frictional contact with the aperture of said boss, said aperture being tapered downwardly so that the expanding action of the screw on the stem will draw the latter into the boss without requiring the head of the screw to contact either with the plate or the stem.

4. In a bird cage, the combination with a cage body and a top cap and a carrying loop therefor, of a plate secured to the top of the body and having an apertured boss, a stem carried by the loop and having a head to receive the same, said stem extending into the cap with its lower end hollow and split and entering the aperture of said boss, and a screw insertable into the stem from below and made to expand the split end of the stem into tight frictional contact with the aperture of the boss, said aperture being tapered upwardly so that the expanding action of the screw on the stem will draw the head of the stem against the cap for clamping the latter to the body.

5. In a bird cage, the combination with a cage body and a top cap and a carrying loop therefor, of a plate secured to the top of the body and having an apertured boss, a stem carried by the loop and having a head to receive the same, said stem extending into the cap with its lower end hollow and split and entering the aperture of said boss, and a screw insertable into the stem from below and made to expand the split end of the stem into tight frictional contact with the aperture of the boss, said aperture being tapered upwardly so that the expanding action of the screw on the stem will draw the head of the stem against the cap for clamping the latter to the body, said cap having a depression about the stem to receive the head of the same.

6. In a bird cage, the combination with a cage body and a top cap and a carrying loop therefor, of a plate secured to the top of the body and having an apertured boss, a stem carried by the loop and extending through the cap with the lower end of the stem hollow and split and entering said aperture, and a screw insertable into said stem from below and made to expand the split end of the stem into tight frictional contact with the aperture of said boss, said boss having a tapered recess at its upper end to guide the stem into the aperture of the same.

7. In a bird cage, the combination with a cage body and a carrying loop therefor, of a plate secured to the top of the body and having an apertured boss, a stem carried by the loop and having its lower end hollow and split and extending into the aperture of said boss, and a screw insertable into said stem from below and having threaded upper and lower portions, the latter being slightly larger than the bore of the stem so as to expand the same into tight frictional contact with the aperture of said boss in the screwing of the larger portion of the screw into said stem so that the loop and the cage body may be turned relatively to each other without affecting the frictional connection between the stem and the boss.

8. In a bird cage, the combination with a cage body and a carrying loop therefor of apertured means at the upper end of the body, the aperture being enlarged at its lower end, a stem depending from the loop and extending into the aperture, and means free from contact with the cage body for expanding the lower end of the stem into contact with the enlarged portion of the aperture, the stem being rotatably mounted in the aperture.

9. In a bird cage, a cage body, a top cap superimposed therein, the top cap and cage body being provided with aligned apertures, a suspending loop having a stem passing downwardly through the apertures, and means free from contact with the cage body for moving said stem axially in the apertures to secure the cap to the cage and to prevent withdrawal of the stem upwardly through the apertures, the stem being rotatably mounted in the apertures.

10. In a bird cage, a cage body, a loop member disposed adjacent the upper portion of said body and adapted to act as a carrying member therefor, the cage body being provided with an aperture at its upper end, and said loop member having a downwardly directed stem rotatably mounted in the aperture and shaped to fit the same, and means free from contact with the cage body to expand the lower end of said stem to prevent upward movement of the latter in the aperture.

In witness whereof I have hereunto set my hand this 16th day of April, 1929.

LEWICKI J. LEON.

CERTIFICATE OF CORRECTION.

Reissue Patent No. 17,926. Granted January 13, 1931, to

LEWICKI J. LEON.

It is hereby certified that the above numbered patent was erroneously issued to the inventor, said "Leon", whereas said patent should have been issued to The Andrew B. Hendryx Company, a Corporation of Connecticut, as shown by the records of assignments in this office; and that the said Letters Patent should be read with this correction therein that the same may conform to the record of the case in the Patent Office.

Signed and sealed this 17th day of February, A. D. 1931.

M. J. Moore,
Acting Commissioner of Patents.

(Seal)